Sept. 2, 1930.  W. WILSON  1,774,956
PROPELLING AND STEERING UNIT FOR BOATS
Filed Dec. 7, 1929  2 Sheets-Sheet 1

WITNESSES
Edw. Thorpe
Hugh H. Ott

INVENTOR
William Wilson
BY
ATTORNEY

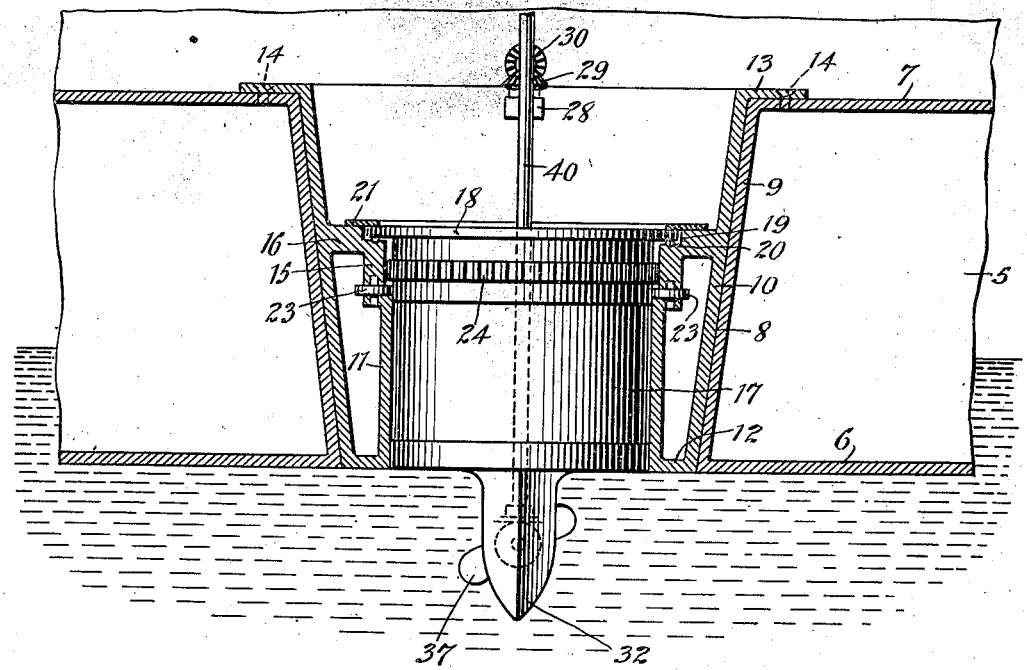
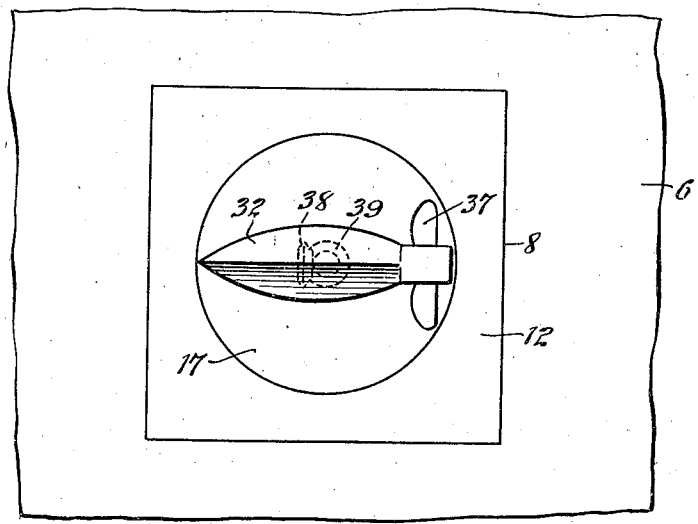

Patented Sept. 2, 1930

1,774,956

UNITED STATES PATENT OFFICE

WILLIAM WILSON, OF NEW YORK, N. Y.

PROPELLING AND STEERING UNIT FOR BOATS

Application filed December 7, 1929. Serial No. 412,547.

This invention relates to a propelling and steering mechanism especially designed for watercraft, and has more particular reference to a propelling and steering unit which may be used individually or in combination with other similar units or as an auxiliary to other motive power and steering mechanisms.

One of the outstanding objects of the invention resides in the provision of an improved propelling and steering unit which is associated with the hull of a vessel in such a manner as to facilitate the emplacement or removal of the same without the necessity of dry-docking the vessel for the purpose of either effecting repairs to or replacements of the propelling and steering mechanisms whenever the occasion arises.

As a further object, the invention comprehends a propelling and steering mechanism which eliminates the necessity of reversing the motor or prime mover, due to the fact that the unit may be swung completely around to drive either forward, backward or sidewise.

Other objects of the invention reside in the provision of a propelling and steering unit which may be employed as an auxiliary power plant for sail boats, which may be used particularly for large flat-bottom vessels where a battery of units is employed and which may function in place of tugs for the docking of large ocean vessels.

Other objects of the invention reside in the provision of an improved propelling or steering unit which is comparatively simple in its construction and mode of operation, which is highly efficient in its purpose and which is inexpensive to produce, install, repair or replace.

With the above recited and other objects in view, reference is had to the following description and accompanying drawing, in which there is exhibited one example or embodiment of the invention, while the claims define the actual scope of the same.

In the drawings:

Figure 3 is a fragmentary transverse sectional view taken approximately on the line indicated at 3—3 in Figure 1.

Figure 4 is a fragmentary bottom plan view.

Figure 1:
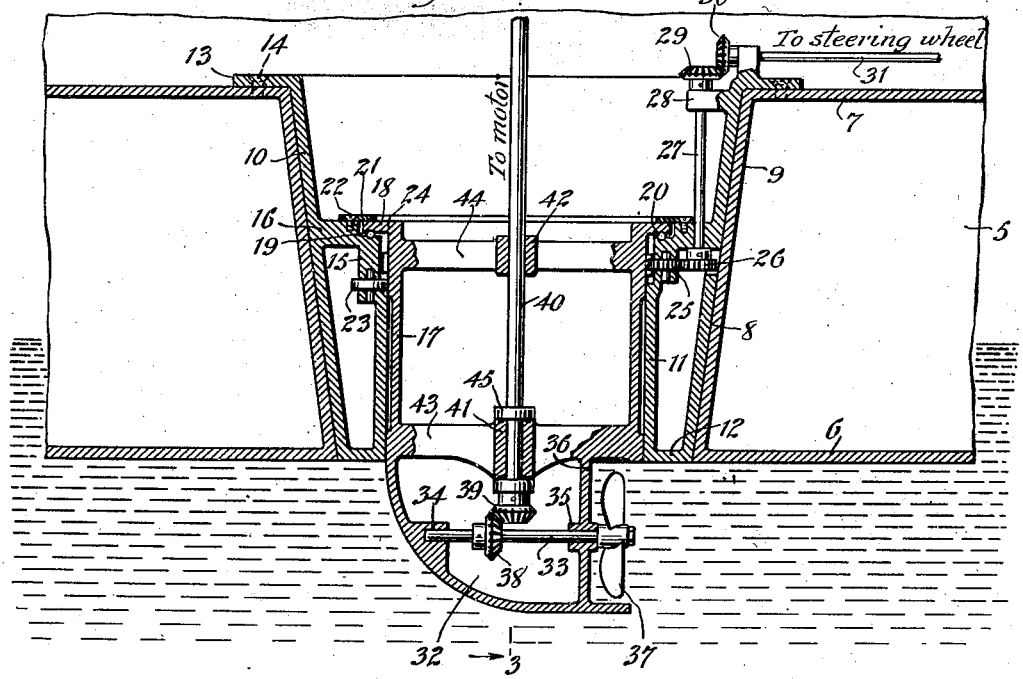
Figure 1 is a fragmentary longitudinal sectional view through a vessel equipped with a propelling and steering unit constructed in accordance with the invention.
Figure 2:
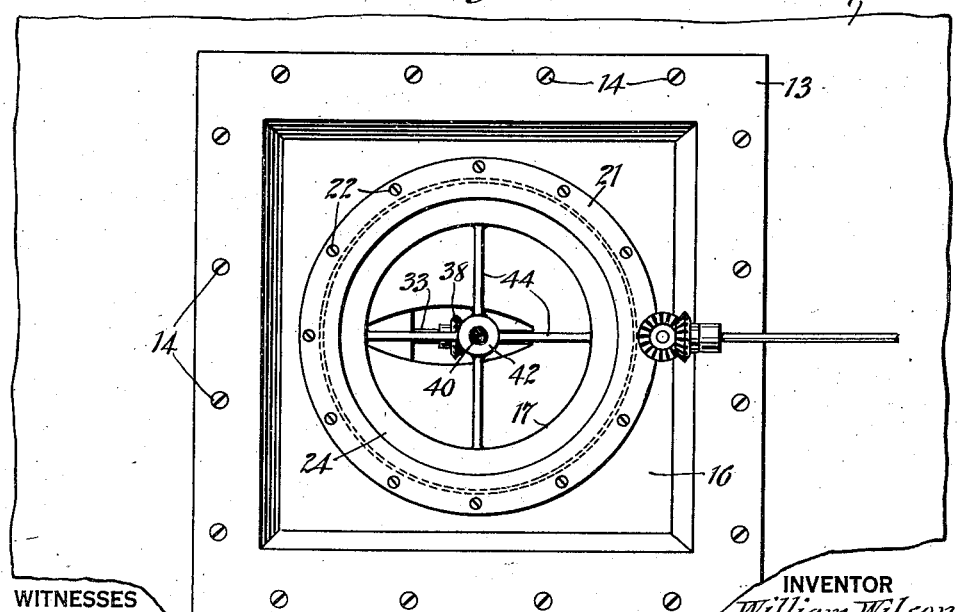
Figure 2 is a fragmentary top plan view thereof.

Referring to the drawings by characters of reference, 5 designates the hull of a vessel which includes a bottom wall 6 and a superposed deck 7. In order to accommodate the propelling and steering unit which constitutes the subject matter of the present invention, the hull 5 is provided with one or more openings 8 which are defined by frusto-conical, preferably square tubular, walls 9 which connect the bottom wall 6 and deck 7. The lower end of the openings 8 is of reduced area or size with respect to the upper end 9 to snugly receive the propelling and steering unit which includes a square tubular frusto-conical outer wall 10 conforming substantially to the shape and size of the opening 8. The unit is provided with an inner vertical hollow cylindrical wall 11 which is connected at its lower end to the lower end of the wall 10 by an annular bottom wall 12. The upper end of the outer wall 10 is formed with the flange 13 which rests upon the neck 7 and is suitably secured by screws, bolts or other fastening elements 14 to the deck, whereby the complete unit may be emplaced or removed in its entirety for the purposes specified. The inner wall 11 of the unit is provided with an enlarged upper end 15 which terminates an appreciable distance below the upper end of the wall 10, and said enlarged upper end 15 of the wall 11 is joined to the wall 10 by a flange 16. A rotatable turret 17 is positioned within the inner wall 11 and conforms approximately to the size and configuration of the wall 11 for the major portion thereof. The turret 17 is preferably of hollow cylindrical formation and is provided at its upper end with an annular outwardly extending flange 18 which is received in the rabbeted portion 19 of the upper enlarged end 15 of the inner wall, suitable anti-friction bearings 20 being interposed between the under side of the flange and the horizontal wall of the rabbeted portion 19. In order to prevent upward movement of the turret 17, an annulus 21 is anchored to the flange 16 and extends partially over the flange 18. The annulus is removably secured in place in any desired manner, such as by the screws or other fastening elements 22 which are anchored in the flange 16. In order to guide the turret when the same is rotated, suitable idler bearing rollers 23 may be circumferentially distributed around the inner wall 11 for peripheral engagement with the turret. In order to provide means for turning the turret in the unit, the turret is formed adjacent its upper end with a ring gear 24 with which an intermediate pinion 25 meshes, the pinion 25 being mounted in a suitable bearing in the enlarged upper end 15 of the inner wall 11. The pinion 25 meshes with a driving gear 26 which is secured to an upwardly extending shaft 27 bearing in the flange 16 and in a bearing bracket 28 adjacent the upper end of the outer wall 10. The outer end of the shaft 27 has secured thereto a bevel gear 29 which meshes with a bevel pinion 30 on a shaft 31 which leads to a driving mechanism for the steering apparatus. The lower end 32 of the turret is suitably shaped and stream-lined to offer the least resistance to the forward motion of the vessel while functioning as a rudder. The lower end 32 of the turret depends from the bottom 6 of the vessel and the lower end is also hollow to accommodate a horizontal propeller shaft 33 which extends longitudinally of the rudder and is mounted in suitable bearings 34 and 35 with the rear end of the propeller shaft protruding beyond the rear wall 36 of the rudder and with the propeller 37 secured to the protruding end thereof. The propeller shaft has secured thereto a bevel pinion 38 which meshes with a bevel gear 39 secured to the lower end of a vertical shaft 40 which leads to or is suitably connected to the prime mover, such as a motor or turbine. The shaft 40 is mounted in suitable bearings 41 and 42 in spider arms 43 and 44 within the turret 17. A thrust bearing 45 may be provided on the shaft 40 to cooperate with the shaft bearing 41.

From the foregoing, it will thus be seen that a propelling and steering unit has been devised by virtue of which the vessel in which it is emplaced may be driven and steered so that the thrust of the propeller 37 is imparted on the water in axial alignment with the direction it is desired to move the craft. It will also be observed that either the entire propelling and steering unit or the turret alone may be removed from the vessel and either repaired and replaced or a new part installed without the necessity of dry-docking the vessel. Where a battery or plurality of units is employed, it is apparent that they may be individually driven and controlled or coupled for driving and control in unison. It will also be obvious that the necessity of reversing the prime mover or motor to drive the craft in an opposite direction is obviated, due to the fact that the turret may be completely turned about on its own axis. It is also apparent that the unit may be employed in combination with others of its kind or with other forms of motive power for the purpose of driving and steering a vessel or for the purpose of docking ocean vessels in place of employing tugs.

What is claimed is:

1. A water craft including a hull having an opening extending vertically through its bottom and a propelling and steering unit removably mounted within the opening, said unit including a stationary outer section completely filling said opening and a relatively rotatable turret mounted in the outer section having a depending rudder shaped lower end protruding below the bottom of the hull and a propeller driven from the interior of the turret and disposed exteriorly thereof and at the rear of said lower end.

2. A water craft including a hull having an opening extending vertically through its bottom and a propelling and steering unit removably mounted within the opening, said unit including a stationary outer section completely filling said opening and a relatively rotatable turret mounted in the outer section having a depending rudder shaped lower end protruding below the bottom of the hull and a propeller driven from the interior of the turret and disposed exteriorly thereof and at the rear of said lower end and means within the stationary outer section operatively connected with the turret for effecting rotation thereof.

3. A water craft including a hull having an opening extending vertically through its bottom and a propelling and steering unit removably mounted within the opening, said unit including a stationary outer section and a relatively rotatable turret mounted in the outer section having a depending rudder shaped lower end protruding below the bottom of the hull and a propeller driven from the interior of the turret and disposed exteriorly thereof and at the rear of said lower end and means within the stationary outer section operatively connected with the turret for effecting rotation thereof, said rotatable turret being removably mounted in the stationary outer section to permit of the separation and removal of the turret from the outer section of the unit.

4. The combination with a water craft including a hull having a substantially frusto-conical opening extending vertically therethrough from its bottom with the enlarged end of the opening disposed upwardly and a propelling and steering unit including an outer stationary section corresponding approximately to the size and shape of the opening, removably mounted in the opening and further including a relatively rotatable turret having a depending rudder shaped lower end protruding below the bottom of the hull and a propeller driven from the interior of the turret disposed exteriorly thereof at the rear of said lower end.

5. A removable and replaceable propelling and steering unit for water craft including a rotatable hollow turret vertically mounted in the hull of the craft, a depending rudder shaped lower end protruding below the bottom of the hull, a propeller disposed rearwardly of the rudder shaped lower end, a propeller shaft extending into said lower end, a vertical drive shaft extending axially of the turret and operatively connected with the propeller shaft and with a driving mechanism and means operatively connected with the turret for turning the same.

6. A removable and replaceable propelling and steering unit for water craft including a rotatable hollow turret vertically mounted in the hull of the craft, a depending rudder shaped lower end protruding below the bottom of the hull, a propeller disposed rearwardly of the rudder shaped lower end, a propeller shaft extending into said lower end, a vertical drive shaft extending axially of the turret and operatively connected with the propeller shaft and with a driving mechanism and means operatively connected with the turret for turning the same, said latter means consisting of a ring gear on the turret, a pinion coacting with the ring gear and means for turning the pinion.

Signed at New York in the county of New York and State of New York, this 6th day of December A. D. 1929.

WILLIAM WILSON.